(12) United States Patent
Guillez

(10) Patent No.: US 6,957,843 B2
(45) Date of Patent: Oct. 25, 2005

(54) FOLDING ROOF FOR VEHICLE WITH SLIDING ELEMENTS

(75) Inventor: Jean-Marc Guillez, Cirieres (FR)

(73) Assignee: France Design, Le Pin (FR)

( * ) Notice: Subject to any disclaimer, the term of this patent is extended or adjusted under 35 U.S.C. 154(b) by 0 days.

(21) Appl. No.: 10/250,516

(22) PCT Filed: Nov. 30, 2001

(86) PCT No.: PCT/FR01/03800

§ 371 (c)(1),
(2), (4) Date: Jul. 1, 2003

(87) PCT Pub. No.: WO02/053401

PCT Pub. Date: Jul. 11, 2002

(65) Prior Publication Data

US 2004/0041434 A1 Mar. 4, 2004

(30) Foreign Application Priority Data

Jan. 4, 2001 (FR) .................................. 01 00083

(51) Int. Cl.$^7$ ................................................ B60J 7/04
(52) U.S. Cl. .............. 296/107.2; 296/108; 296/107.08; 296/210
(58) Field of Search ....................... 296/107.2, 107.19, 296/107.01, 108, 121, 107.08, 210, 216.01, 296/220.01, 222, 216.04, 216.05

(56) References Cited

U.S. PATENT DOCUMENTS

| | | | | |
|---|---|---|---|---|
| 3,021,174 | A | * | 2/1962 | Rund ....................... 296/107.2 |
| 3,347,592 | A | * | 10/1967 | Renneker ................. 296/107.2 |
| 5,078,447 | A | * | 1/1992 | Klein et al. ............... 296/107.2 |
| 5,542,735 | A | * | 8/1996 | Furst et al. ............. 296/107.18 |
| 5,558,388 | A | * | 9/1996 | Furst et al. .............. 296/107.2 |
| 6,419,296 | B2 | * | 7/2002 | Dintner et al. ......... 296/107.18 |
| 6,669,279 | B2 | * | 12/2003 | Messerschmidt ....... 296/220.01 |
| 2002/0163227 | A1 | * | 11/2002 | Pfalzgraf et al. ...... 296/220.01 |

* cited by examiner

Primary Examiner—Hilary Gutman
(74) Attorney, Agent, or Firm—Nawrocki, Rooney & Sivertson, P.A.

(57) ABSTRACT

The invention concerns a folding roof for vehicle, comprising a rigid front roof element (1), a rigid intermediate roof element (2) and a rigid rear roof element (3). The displacement of the rear element towards the rear deck (5) is guided by fingers (6) borne by the rear part of the rear element (3) and slidably engaged in the slide rails (7), (10) extending inside the deck (5). The displacement of the intermediate element (2) and the front element (1) is guided by the slide rails borne by two adjacent roof elements and by fingers engaged in said slide rails and borne by two other adjacent roof elements, enabling the front element (1) and the intermediate element (2) to slide towards each other and to slide towards the rear element (3) so that the three elements can be superimposed.

14 Claims, 4 Drawing Sheets

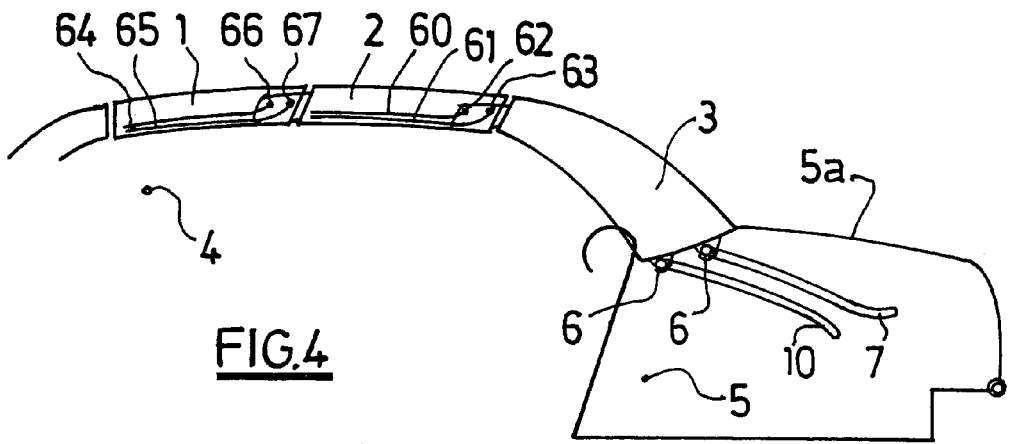
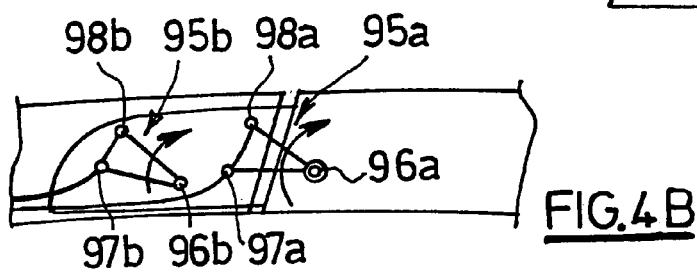
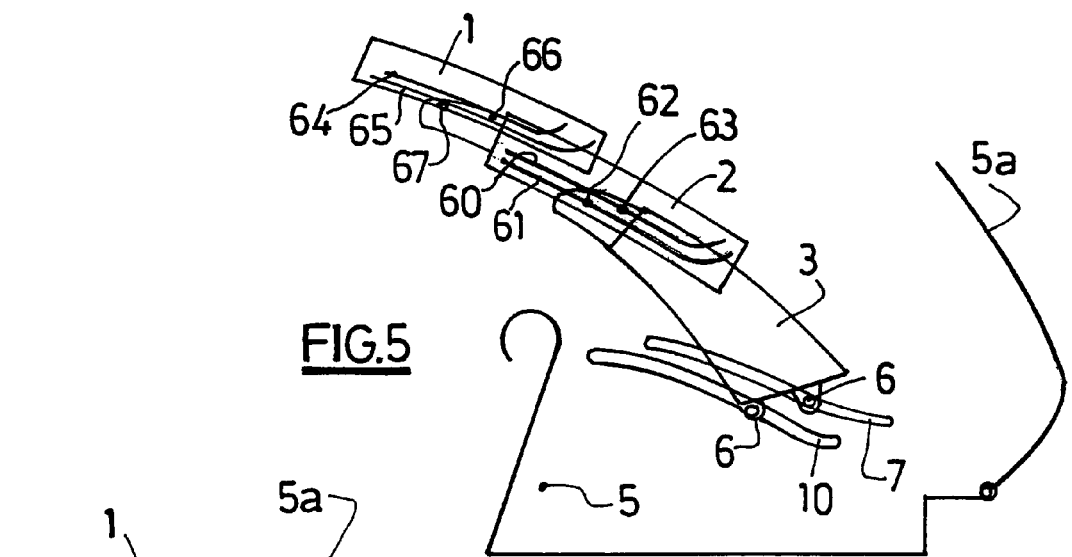
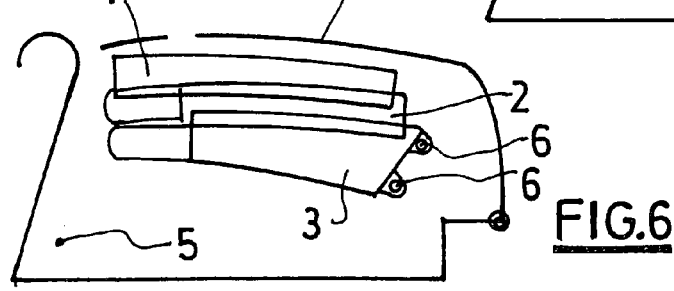

FOLDING ROOF FOR VEHICLE WITH SLIDING ELEMENTS

The invention concerns a roof which can be retracted or folded away in the rear deck of a vehicle.

A retractable roof of this type makes it possible in particular to convert a vehicle of the two-seater coupe or four-seater coupe or saloon type into a vehicle of the cabriolet type.

In the case of four-seater coupés or saloons, the roof has a relatively great length, so that the retractable roof is composed of three elements, each of which has a length compatible with the dimensions of the vehicle and deck.

Thus a retractable roof for a vehicle is known, comprising a front roof element, an intermediate roof element and a rear roof element, these three elements being able to move between a position in which they cover the vehicle cabin and a position in which they are superimposed substantially horizontally in the rear deck of the vehicle.

The aim of the invention is to provide improvements to the known means, for optimally controlling and guiding the movement of the roof elements between their closed position and their position of storage in the deck.

According to the invention, the retractable roof is characterised in that the movement of the rear element towards the deck is guided by fingers carried by the rear part of the rear element and slidably engaged in slide rails extending inside the deck, in that the movement of the intermediate element and of the front element is guided by slide rails carried by two adjacent roof elements and by fingers engaged in the said slide rails and carried by two other adjacent roof elements, enabling the front element and the intermediate element to slide towards each other and to slide towards the rear element so that the three elements can be superimposed.

According to a first embodiment, the longitudinal slide rails enabling the front element and the intermediate element to slide towards each other and to slide towards the rear element are carried by the intermediate roof element and by the rear roof element.

According to a second embodiment, the longitudinal slide rails enabling the front element and the intermediate element to slide towards each other and to slide towards the rear element are carried by the front roof element and by the intermediate roof element.

In a variant of the invention, which can also be in accordance with the two embodiments described above, when the front roof element slides it positions itself below the intermediate element, which itself when sliding positions itself below the rear element.

Other particularities and advantages of the invention will also appear in the following description.

In the accompanying drawings, given by way of non-limiting examples:

FIG. 4 is a schematic view in partial longitudinal section of a vehicle equipped with a retractable roof in the closed position, according to a second embodiment of the invention;

FIG. 4B is a partial view of FIG. 4 presenting a different embodiment according to which three-point links (instead of fingers) engage in the slide rails;

FIG. 5 is a view similar to FIG. 4 (second embodiment), the retractable roof being in an intermediate position;

FIG. 6 is a view similar to FIGS. 4 and 5 (second embodiment), the retractable roof being in the position stored in the vehicle deck;

Figure 1:
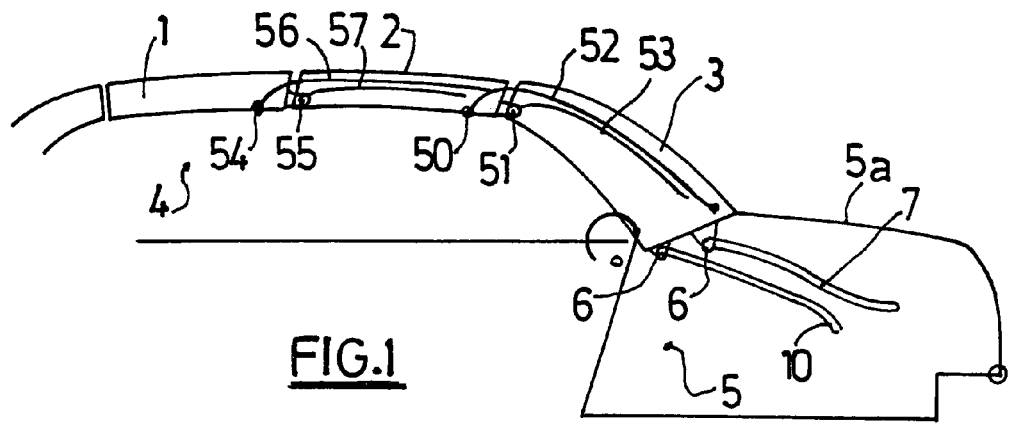
FIG. 1 is a schematic view in partial longitudinal section of a vehicle equipped with a retractable roof in the closed position, according to a first embodiment of the invention.

In the embodiments depicted in FIGS. 1 to 9, the retractable roof for a vehicle comprises a front roof element 1, an intermediate roof element 2 and a rear roof element 3. These three elements 1, 2, 3 are able to move between a position in which (see FIGS. 1, 4 and 7) they cover the vehicle cabin 4 and a position in which (see FIGS. 3, 6 and 9) they are superimposed substantially horizontally in the rear deck 5 of the vehicle.

In accordance with the invention and in all the embodiments depicted, the movement of the rear element (3) towards the deck (5) is guided by fingers (6) carried by the rear part of the rear element (3) and slidably engaged in slide rails (7), (10) extending inside the deck (5). The rear element (3) is connected to the intermediate element (2), the latter is itself connected to the front element (1) by fingers engaged in longitudinal slide rails enabling the front element (1) and the intermediate element (2) to slide towards each other and to slide towards the rear element (3) so that the three elements can be superimposed.

Figure 2:
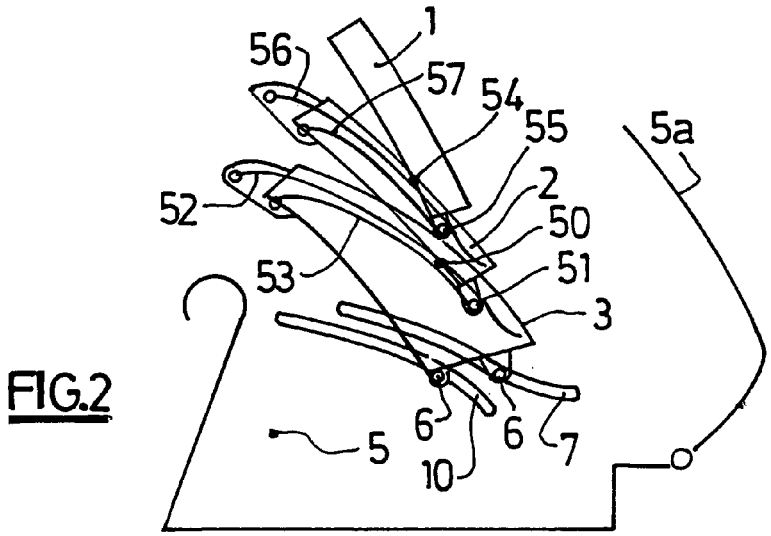
FIG. 2 is a view similar to FIG. 1 (first embodiment), the retractable roof being in an intermediate position.
Figure 3:
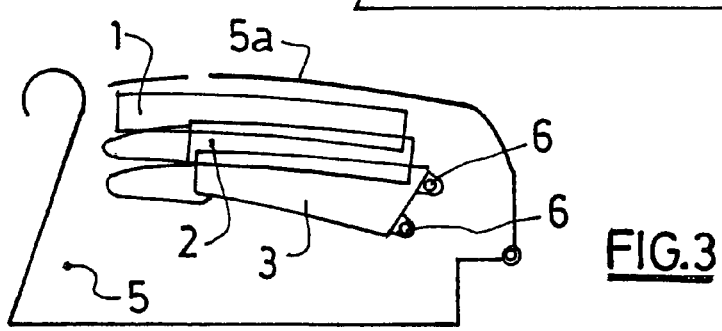
FIG. 3 is a view similar to FIGS. 1 and 2 (first embodiment), the retractable roof being in the position stored in the vehicle deck.

In the embodiment depicted in FIGS. 1 to 3, the retractable roof is designed so that the longitudinal runners (52, 53), (56, 57) are adapted so that the front element (1) can, when sliding, position itself above the intermediate element (2), and so that the intermediate element (2) can, when sliding, position itself above the rear element (3).

Indeed the movement of the rear element (3) towards the deck (5) is guided by fingers (6) carried by the rear part of the rear element (3) and slidably engaged in slide rails (7), (10) extending inside the deck (5).

The intermediate element (2) is connected to the rear element (3) by two fingers (50) and (51) carried by the rear part of the intermediate element (2) and slidably engaged in slide rails (52), (53) extending inside the rear element.

The front element (1) is connected to the intermediate element (2) by two fingers (54) and (55) carried by the rear part of the front element (1) and slidably engaged in slide rails (56) and (57) extending inside the intermediate element (2).

Figure 1B:
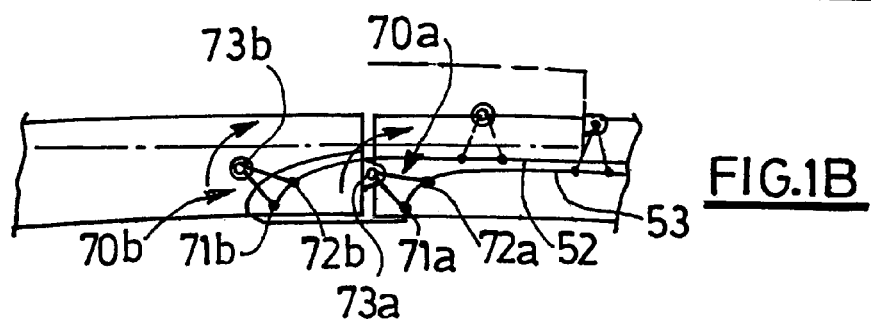
FIG. 1B is a partial view of FIG. 1 presenting a different embodiment according to which three-point links (instead of fingers) engage in the slide rails.

In the case of FIG. 1B, the fingers (50, 51) or (54, 55) are replaced by three-point links (70a, 70b), where two pairs of fingers (71a, 72a) and (71b, 72b) are engaged in the slide rails (52, 53) or (56, 57) and articulated at (73a, 73b) on the intermediate element (2) or the front element (1).

These links (70a, 70b) make it possible to raise the intermediate roof element (2) higher on the rear roof element (3) or the front roof element (1) higher on the intermediate roof element (2) when the roof elements are opened and slid.

When the roof is in the closed position (FIG. 1), the rigid roof elements (1), (2), (3) are aligned with each other, and this is why the slide rails (52, 53), (56, 57) are provided, in their front part, with a curvature oriented downwards in order to raise the roof element adjacent to the corresponding slide rails when the roof is opened.

The radii of curvature of the front of the various slide rails (52, 53), (56, 57) can be adapted according to the movement which it is wished to apply to the roof element when it slides. For example, a radius of curvature of the slide rail (56) which would be greater than that of the slide rail (57) would cause a pivoting of the element (1) when it is raised.

In the embodiment presented in FIGS. 4 to 6, the roof elements (1), (2), (3) slide one above the other in a similar manner to the embodiment in FIGS. 1 to 3. However, the position of the slide rails changes since the intermediate element (2) comprises two slide rails (60) and (61) extending between its front and rear edges in which there are engaged two fingers (62), (63) fixed to the front edge of the rear element (3) so that the intermediate element (2) can slide on the rear element (3).

The front element (1) comprises two slide rails (64), (65) extending between its front and rear edges in which there are engaged two fingers (66), (67) fixed to the front edge of the intermediate element (2) so that the front element (1) can slide on the intermediate element (2).

In the case in FIG. 4B, the fingers (62, 63) or (66, 67) are replaced by three-point links (95a, 95b), where two pairs of fingers (97a, 98a), (97b, 98b) are engaged in the slide rails (60, 61) or (64, 65) and articulated at (96a, 96b) on the intermediate element (2) or the rear element (3).

These links (95a, 95b) make it possible to raise the intermediate roof element (2) higher on the rear roof element (3) or the front roof element (1) higher on the intermediate roof element (2) when the roof elements are opened and slid.

Likewise, the slide rails (60, 61), (64, 65) comprise, in their rear part, a curvature oriented upwards in order to raise the roof element comprising the corresponding slide rails when the roof is opened. The radius of these curvatures can also be adapted to apply, during sliding, a given movement to the controlled roof element.

Figure 7:
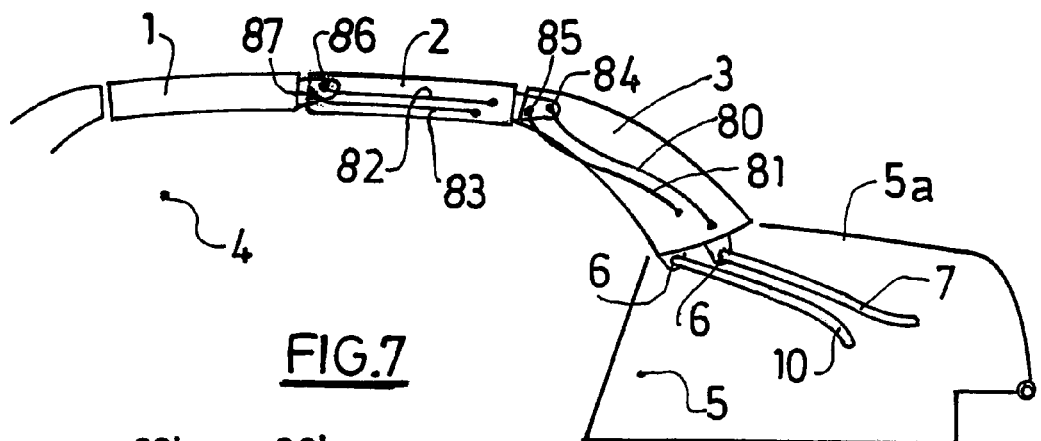
FIG. 7 is a schematic view in partial longitudinal section of a vehicle equipped with a retractable roof in the closed position, according to a variant of the invention.
Figure 8:
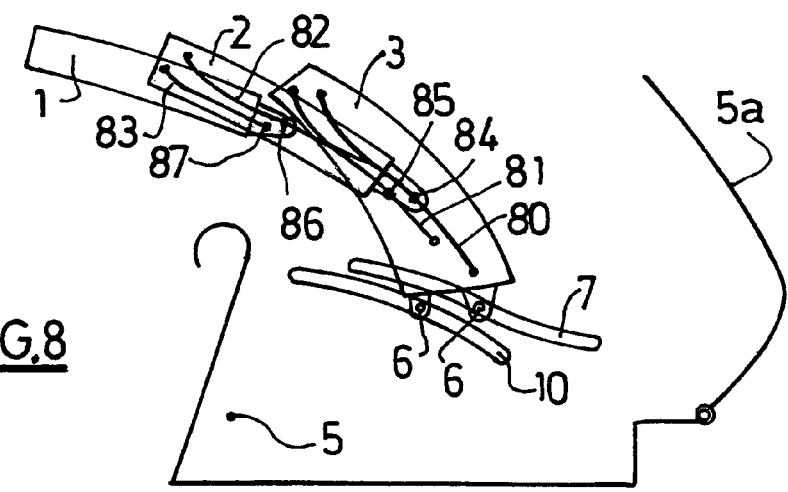
FIG. 8 is a view similar to FIG. 7 (variant), the retractable roof being in an intermediate position.
Figure 9:
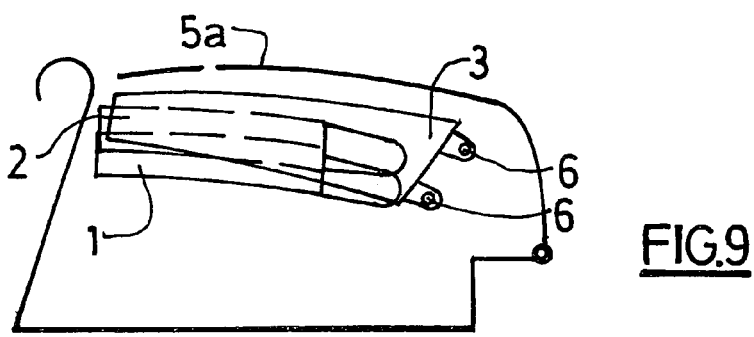
FIG. 9 is a view similar to FIGS. 7 and 8 (variant), the retractable roof being in the position stored in the vehicle deck.

The embodiment presented in FIGS. 7 to 9 shows a variant according to which the elements (1), (2), (3) slide under one another.

In this case, the intermediate element (2) is connected to the rear element (3) by two fingers (84), (85) carried by the rear part of the intermediate element (2) and slidably engaged in slide rails (80), (81) extending inside the rear element (3).

The front element (1) is connected to the intermediate element (2) by two fingers (86) and (87) carried by the rear part of the element (1) and slidably engaged in slide rails (82), (83) extending inside the intermediate element (2).

Figure 7B:
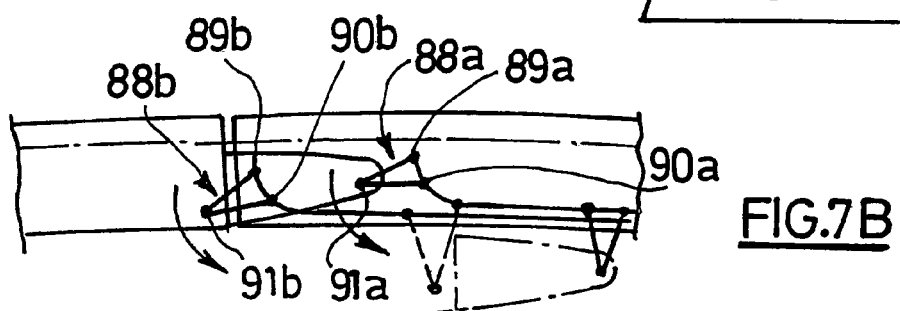
FIG. 7B is a partial view of FIG. 7 presenting a different embodiment according to which three-point links (instead of fingers) engage in the slide rails.

In the case in FIG. 7B, the fingers (84, 85) and (86, 87) are replaced by three-point links (88a, 88b), where two pairs of fingers (89a, 90a), (89b, 90b) are engaged in the slide rails (80, 81) or (82, 83) and articulated at (91a, 91b) on the intermediate element (2) or the front element (1).

These links (88a, 88b) make it possible to lower the intermediate roof element (2) further under the rear roof element (3) or the front roof element (1) under the intermediate roof element (2) when the roof elements are opened and slid.

Likewise, the slide rails (80, 81), (82, 83) comprise, in their front part, a curvature oriented upwards so as to lower the roof element adjacent to the corresponding slide rails when the roof is opened. The radius of these curvatures can also be adapted to apply, during sliding, a given movement to the controlled roof element.

The sliding of the roof elements (1), (2), (3) with respect to one another and the sliding of the element (3) towards the inside of the deck can be motorised, for example by motors or actuators.

Figure 10:
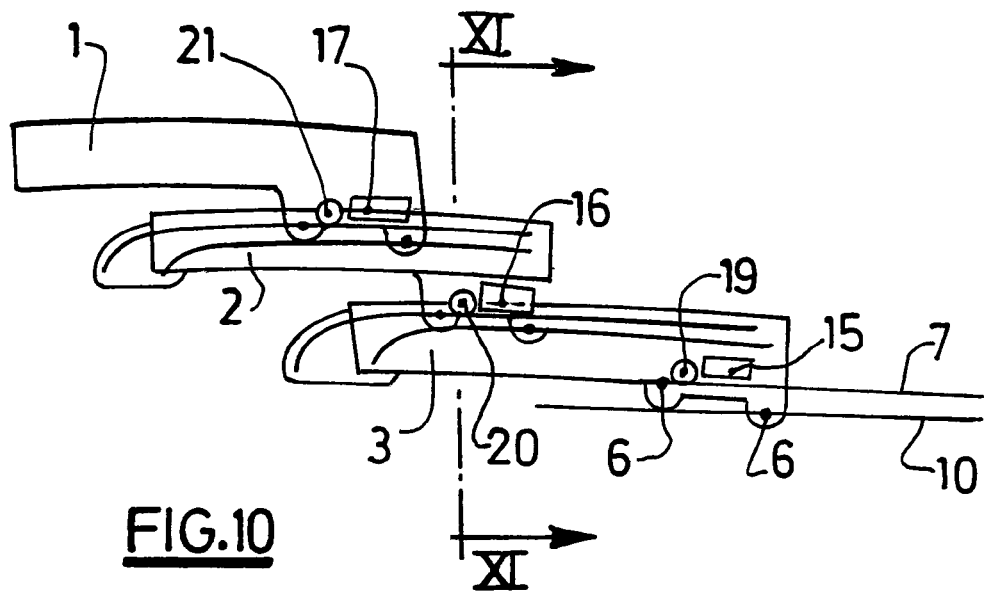
FIG. 10 is a view of a system for motorising the roof elements comprising three motors.

FIG. 10 shows a motorisation in which each rigid roof element (1), (2), (3) comprises a motor (17), (16), (15) with a roller transmission (21), (20), (19).

Figure 11:
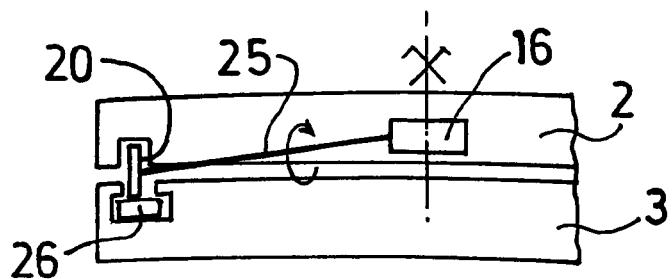
FIG. 11 is a view in section along the plane XI—XI in FIG. 10.

In FIG. 11, it can be seen that, in the roof element (2), a motor (16) drives a shaft (25) fixed to a roller (20) on each side of the roof element (2), the said roller (20) meshing on a rack (26), and makes it possible to move the roof element (2). The device is identical for each roof element (1), (2), (3).

Figure 12:
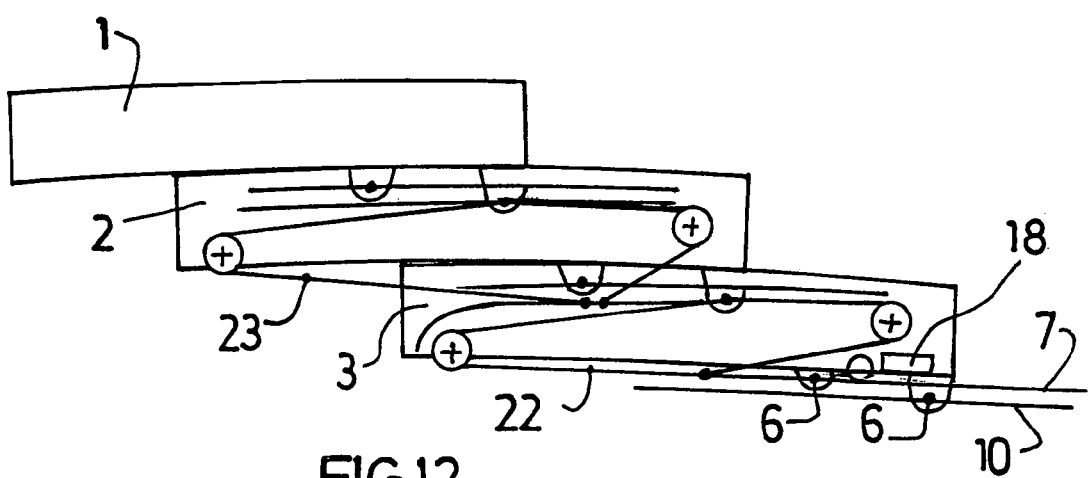
FIG. 12 is a view of a system for motorising the roof elements comprising a single motor.

FIG. 12 shows a motorisation with a single motor (18) associated with a pulley and cable system (22), (23) for the transmission of the movement to each roof element (1), (2), (3).

The retractable roof which has just been described functions in the manner indicated below.

When the roof is in the closed position, the elements (1), (2), (3) are locked on one another and on fixed parts of the bodywork.

The top face of the deck is closed by a lid (5a).

To open the roof, the first step is to release the elements (1), (2) and (3) and to open the lid (5a) of the deck (5).

Next the roof elements (1), (2), (3) are made to slide towards one another and the whole to slide towards the inside of the deck (5).

At the end of travel, the elements (3), (2), (1) are stored in the rear deck so as to be superimposed and substantially horizontal.

It is then possible to close the lid (5a) of the deck (5) again.

In a simplified version of the invention, in particular in the case of coupes having only two seats, the retractable roof could comprise only the two elements (2) and (3).

What is claimed is:

1. A retractable roof for a vehicle, comprising a front roof element (1), an intermediate roof element (2) and a rear rigid roof element (3), the three elements being able to move between a position in which they cover the vehicle cabin (4) and a position in which they are superimposed substantially horizontally in the rear deck (5) of the vehicle, comprising first fingers, first and second slide rails, third slide rails, and third fingers characterised in that the movement of the rear element (3) towards the deck (5) is guided by said first fingers carried by the rear part of the rear element (3) and slidably engaged in said first and second slide rails which extend inside the deck (5), in that the movement of the intermediate element (2) and of the front element (1) is guided by said third slide rails carried by the two adjacent front and intermediate roof elements and by said third fingers which engage said third slide rails and are carried by said front and intermediate adjacent roof elements, enabling the front element (1) and the intermediate element (2) to slide towards each other and to slide towards the rear element (3) so that the three elements can be superimposed.

2. A retractable roof according to claim 1, characterised in that said third slide rails are adapted so that the front element (1) can, when sliding, position itself above the intermediate element (2), and so that the intermediate element (2) can, when sliding, position itself above the rear element (3).

3. A retractable roof according to claim 1, characterised in that the rear element (3) comprises fifth and sixth slide rails and fifth and sixth fingers, with said fifth and sixth slide rails being situated one on top of the other and extending between its front and rear edges, said fifth and sixth fingers (50, 51) being fixed to the rear edge of the intermediate element (2) such that the fifth and sixth fingers respectively engage the fifth and sixth slide rails, and such that the intermediate element (2) can slide on the rear element (3), the intermediate element (2) comprising sixth and seventh slide rails situated one above the other and extending between the front and rear edges thereof and two sixth and seventh fingers in which said sixth and seventh fingers, respectively engage said sixth and seventh slide rails and are fixed to the rear edge of the front element (1) so that the front element (1) can slide on the intermediate element (2).

4. A retractable roof according to claim 1, characterised in that the rear element (3) comprises seventh and eighth slide rails situated one above the other and extending between its front and rear edges, and comprises two seventh and eighth pairs of fingers, said fifth and sixth fingers respectively engaging said fifth and sixth slide rails, and further comprising first and second three-point links which respectively carry said seventh and eighth fingers and are articulated on the rear edge of the intermediate element (2) so that the intermediate element (2) can slide on the rear element (3), in that the intermediate element (2) also comprises ninth and tenth slide rails situated one above the other and extending between their respective front and rear edges, and further comprises engaged pairs of ninth and tenth fingers, and second three-point links, with said respective fingers being carried by said third three-point links, said links being articulated on the rear edge of the front element (1) so that the front element (1) can slide on the intermediate element (2).

5. A retractable roof according to claim 3, characterised in that the fifth and sixth slide rails (52, 53), (56, 57) comprise, in their front part, a curvature oriented downwards so as to raise the roof element adjacent to the corresponding slide rails when the roof is opened.

6. A retractable roof according to claim 1, characterised in that the intermediate element (2) comprises eleventh and twelfth slide rails situated one above the other and extending between the front and rear edges thereof, and further comprises engaged eleventh and twelfth fingers fixed to the front edge of the rear element (3) SO that the intermediate element (2) can slide on the rear element (3), in that the front element (1) also comprises two thirteenth and fourteenth slide rails situated one above the other and extending between its front and rear edges thereof, and further comprises engaged thirteenth and fourteenth fingers which are fixed to the front edge of the intermediate element (2) so that the front element (1) can slide on the intermediate element (2).

7. A retractable roof according to claim 1, characterised in that the intermediate element (2) comprises fifteenth and sixteenth slide rails situated one above the other and extending between its front and rear edges, and further comprises two pairs of engaged fifteenth and sixteenth fingers and fourth three-point links, whereby said fifteenth and sixteenth fingers which carry said fifteenth and sixteenth fingers and are articulated on the front edge of the rear element (3) so that the intermediate element (2) can slide on the rear element (3), in that the front element (1) also comprises seventeenth and eighteenth slide rails situated one above the other and extending between the front and rear edges thereof, and further comprises two pairs of seventeenth and eighteenth fingers, and fourth three-point links, with said fourth three-point links carrying said seventeenth and eighteenth fingers, and with said seventeenth and eighteenth fingers respectively engaging said seventeenth and eighteenth slide rails, with said fourth three-point links being articulated on the front edge of the intermediate element (2) so that the front element (1) can slide on the intermediate element (2).

8. A retractable roof according to claim 6, characterised in that the eleventh and twelfth slide rails (60, 61), (64, 65) comprise, in their rear part, a curvature oriented upwards in order to raise the roof element comprising the corresponding slide rails when the roof is open.

9. A retractable roof according to claim 1, characterised in that said third and fourth slide rails are adapted so that the front element (1) can, when sliding, be positioned below the intermediate element (2) and so that the intermediate element (2) can, when sliding, be positioned below the rear element (3).

10. A retractable roof according to claim 1, characterised in that the rear element (3) comprises nineteenth and twentieth slide rails situated one above the other and extending between the front and rear edges of said rear element (3), and further comprises nineteenth and twentieth fingers fixed to the rear edge of the intermediate element (2), with the rear element engaging said nineteenth and twentieth fingers such that the intermediate element (2) can slide under the rear element (3), in that the intermediate element (2) also comprises twenty-first and twenty second slide rails situated one above the other and extending between the front and rear edges of said intermediate element (2), and further comprises twenty-first and twenty second fingers fixed to the rear edge of the front element (1), with the intermediate element engaging said twenty-first and twenty second fingers such that the front element (1) can slide under the intermediate element (2).

11. A retractable roof according to claim 1, characterised in that the rear element (3) comprises twenty-third and twenty-fourth pairs of slide rails situated one above the other and extending between the front and rear edges of said rear element (3), and comprises engaged twenty-third and twenty-fourth pairs of fingers, which respectively engage said twenty-third and twenty fourth pairs of slide rails, and further comprises fifth and sixth three-point links articulated on the rear edge of the intermediate element (2), which respectively carry said twenty-third and twenty-fourth pairs of fingers so that the intermediate element (2) can slide under the rear element (3), in that the intermediate element (2) also comprises twenty-fourth and twenty-fifth slide rails situated one above the other and extending between its front and rear edges and further comprises twenty-fourth and twenty-fifth pairs of fingers which engage said twenty-fourth and twenty fifth slide rails and fifth three-point links articulated on the rear edge of the front element (1) which carry said twenty-fourth and twenty fifth pairs of fingers so that the front element (1) can slide under the intermediate element (2).

12. A retractable roof according to claim 10, characterised in that the nineteenth and twentieth slide rails (80, 81), (82, 83) comprise, in their front part, a curvature oriented upwards in order to lower the roof element adjacent to the corresponding slide rails when the roof is opened.

13. A retractable roof according to claim 1, characterised in that the movements in the third, second and first slide rails of the front (1), intermediate (2) and rear (3) roof elements are controlled by motors (17), (16), (15) placed in each of the said roof elements (1), (2), (3), each of the motors (17), (16), (15) being associated with means of transmission (21), (20), (19) to the corresponding slide rail.

14. A retractable roof according to claim 1, characterised in that the movements in the third, second and first slide rails of the front (1), intermediate (2) and rear (3) roof elements are controlled by a single motor (18) associated with means of transmission by cable (22), (23) providing the movement of each of the said elements (1), (2), (3) in its corresponding slide rail.

\* \* \* \* \*